Dec. 4, 1951     H. A. QUIST     2,577,629
STORAGE TANK LIQUID LEVEL MEASURING DEVICE
Filed May 29, 1948     3 Sheets-Sheet 1
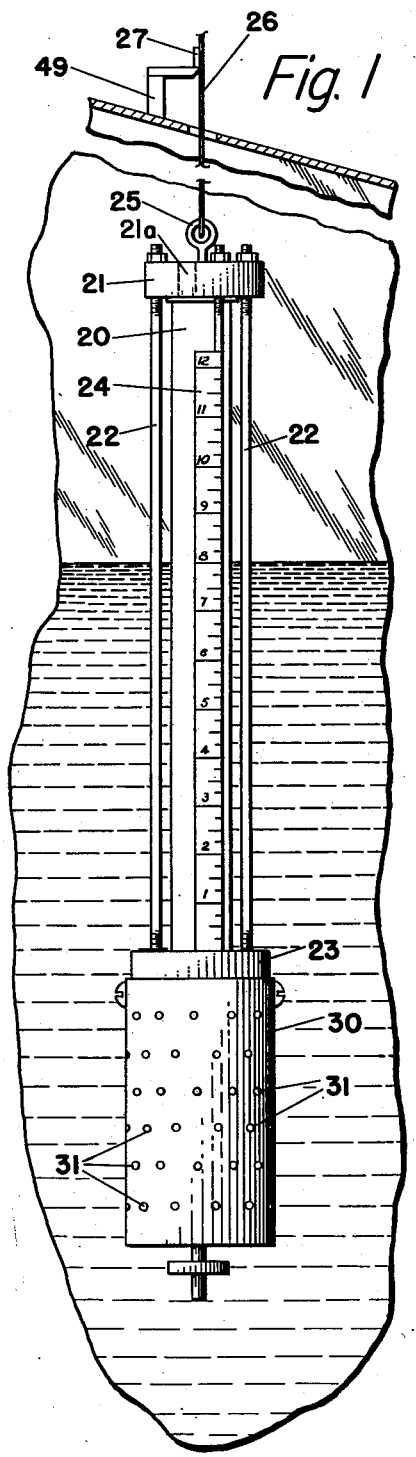
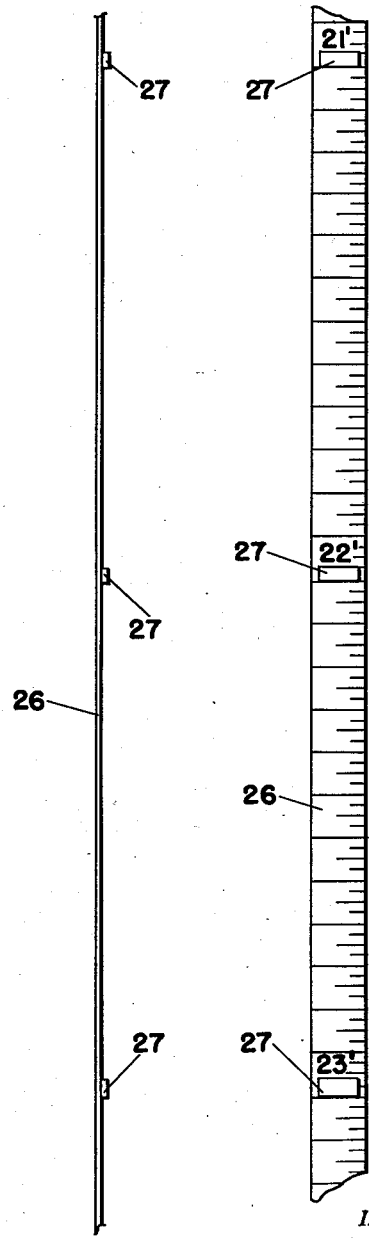
INVENTOR.
HAROLD A. QUIST
BY
ATTORNEY Dec. 4, 1951 H. A. QUIST 2,577,629
STORAGE TANK LIQUID LEVEL MEASURING DEVICE
Filed May 29, 1948 3 Sheets-Sheet 2
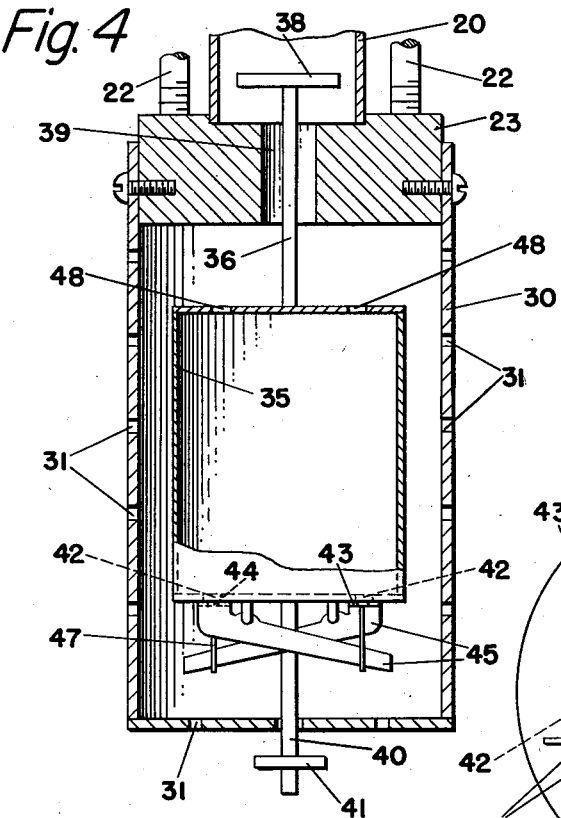
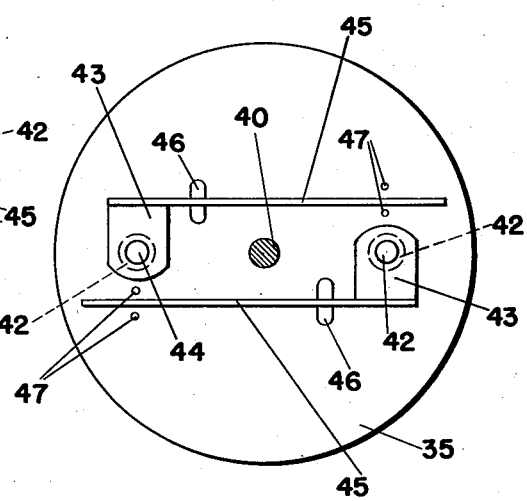
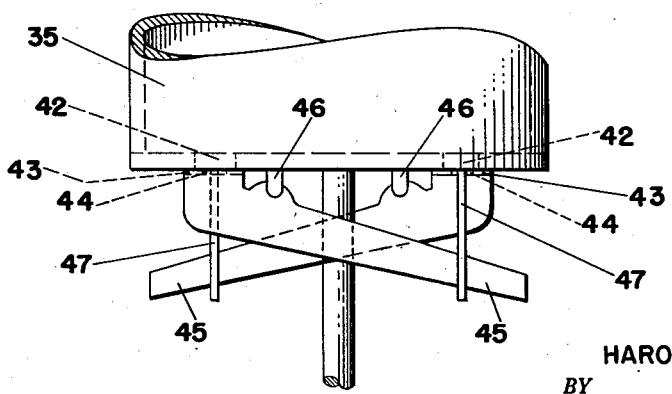
INVENTOR.
HAROLD A. QUIST
BY
ATTORNEYS Dec. 4, 1951 H. A. QUIST 2,577,629
STORAGE TANK LIQUID LEVEL MEASURING DEVICE
Filed May 29, 1948 3 Sheets-Sheet 3

INVENTOR.
HAROLD A. QUIST
BY
ATTORNEYS

Patented Dec. 4, 1951

2,577,629

UNITED STATES PATENT OFFICE 2,577,629

STORAGE TANK LIQUID LEVEL MEASURING DEVICE

Harold A. Quist, Elkton, Md., assignor to Sun Oil Company, Philadelphia, Pa., a corporation of New Jersey Application May 29, 1948, Serial No. 30,039

11 Claims. (Cl. 33—126.4)

This invention relates to liquid level measuring devices and particularly to those used for determining the depth of the liquid contents of large storage tanks.

The primary object of this invention is to provide a device which may be used to quickly and accurately determine the elevation of the level of the liquid contents with reference to a fixed datum point.

Another object is to provide a device which will accept and retain a level of liquid equal to the depth of immersion whereby the elevation of the liquid in which the device has been immersed may be quickly and accurately determined.

A further object is to provide a portable, lightweight gauge which may be carried by an operator from tank to tank and which will function accurately and quickly to determine the liquid level within the tank.

In general, the invention comprises a transparent tube having graduations thereon or associated therewith, which is suspended by means of a flexible tape. The tape has graduations thereon as well as cleats secured thereto at regularly spaced intervals, the cleats corresponding to the graduations. The cleats may be positioned on the flexible tape at one-foot intervals. The lower portion of the transparent tube has an orifice therein to permit the liquid within the tank to enter the tube and rise to a point adjacent the liquid level within the tank. A cage is suspended from the bottom of the tube and a float of hollow construction is mounted within the cage. A valve stem is secured to the upper portion of the float and extends upwardly therefrom, and a valve, preferably of disc type, is secured to the upper portion of the stem. The hollow float is provided with valved orifices and is constructed to act as a dash-pot for controlling the closing of the valve, so that in operation, the valve may be opened quickly and be maintained in its open position for a sufficient length of time to permit the tank liquid to rise within the tube, after which the valve will be closed slowly so that the closing of the valve will not disturb the liquid within the tube. The valve is closed by the float construction after the device has been partially immersed within the tank liquid, by permitting the tank liquid to slowly enter the hollow float until the float is filled or substantially filled with the liquid, after which the float sinks within its cage and securely closes the valve.

A more specific object of the invention is, therefore, to insure a valve actuating means which will operate to quickly open the valve when the device is partially immersed in the tank liquid and which will maintain the valve in an open position for a sufficient length of time to permit the liquid to rise within the device, and thereafter securely close the valve to retain the liquid within the device.

Other objects of the invention will be apparent from the following specification and an inspection of the drawings.

In the drawings,

Figure 1 is an elevation view of the assembled ullage rod,

Figure 2 is a front view of the flexible tape,

Figure 3 is a side view of the flexible tape,

Figure 4 is an elevation in section of the ullage rod valve mechanism,

Figure 5 is an enlarged elevation of the flapper valve construction,

Figure 6 shows a plan view of the flapper valves,

Figure 7:
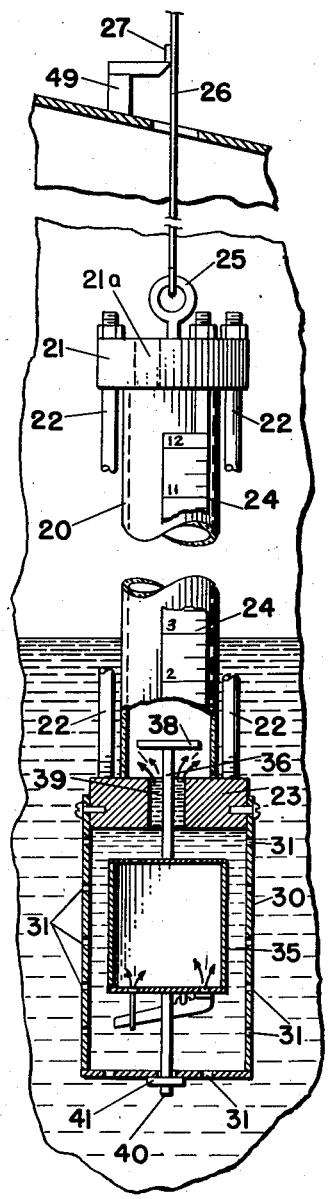
Figures 7, 8 and 9 show the operation of the ullage rod when immersed in the liquid to be measured.

Referring to Figure 1, reference numeral 20 indicates a transparent tube formed of glass or other suitable material which is supported at its upper end by upper cap 21. This cap is vented by hole 21a to permit equalizing the gas pressure in tube 20 with that of the tank. A plurality of rods 22 extend from the upper cap 21 downwardly to a lower cap 23 to secure the caps and tube together. The glass tube 20 is provided with graduations 24 numbered from the bottom upward as a scale mounted on one of the rods 22 as shown. A ring 25 is secured to the upper cap 21 and provides a fastening means for the flexible tape 26.

The flexible tape 26 is provided with graduations numbered downwardly so that the highest graduation number is toward the securing ring on the top of the ullage rod as indicated in Figures 2 and 3. Cleats 27 are secured at regularly spaced intervals on the tape 26 and correspond to the graduations thereon.

The details of the valve construction are shown by Figures 4, 5 and 6. As illustrated in Figure 4, a cylindrical cage 30, formed of any suitable material and having an open top portion, is attached to the lower cap 23 of the ullage rod by any suitable means such as the machine screws shown. The cage 30 is provided with a plurality of apertures 31 to permit the liquid in which the ullage rod is immersed to freely enter the cage. A hollow float 35, formed preferably of aluminum or other suitable light-weight material, is housed within the cage 30. A valve stem 36 is secured to the top of the float 35 and a disc valve 38 is mounted on the upper end of valve stem 36 to project into the transparent tube 20 of the ullage rod as shown. The valve 38 is adapted to control the flow of liquid to the tube 20 through an orifice 39 formed in the lower cap 23.

A guide stem 40 is secured to the bottom of the float 35 and extends through an aperture formed in the wall of the cage 30 to maintain the float 35 in proper alignment within, and relative to, the cage. A suitable stop 41 is fixed to the guide stem 40 to limit the upward movement of the float within the cage.

The float 35 is provided with a pair of orifices 42 formed in the bottom wall. Flap valves 43 as detailed in Figures 5 and 6 are adapted to partially close orifices 42 by including in the flap structure 43 a smaller aperture 44. The reason for this construction will be evident from a discussion of the operation of the device later in this specification. The valves 43 are mounted adjacent to one end of arms 45 which are pivoted to the bottom wall of the float 35 by means of U-shaped brackets 46. The pivotal connections 46 and the arms 45 are arranged under the bottom of the float 35 so that the valve 43 underlies the orifice 42 formed in the float and so that the orifices 44 formed in the valve 43 are in registry with the orifices 42. It will be seen, particularly in Figure 6, that the orifices 42 are approximately twice the diameter of the orifices 44. Guide straps 47, secured to the bottom of float 35, limit the downward and lateral movement of the free ends of the arms 45. As the distance from the pivotal connections 46 of the arms 45 to the free end of the arms is greater than the distance to the connection to the flap valve, the free ends of the arms 45 act as a weight to maintain the flap valve 43 in contact with the under side of the float 35 and thus restrict the orifices 42. Suitable air vents 48 are positioned in the top of the float 35.

For a complete understanding of the operation of the measuring device, reference is made to Figures 2 and 3 which illustrate the flexible member which suspends the ullage rod, the details of which have been described above, and Figures 7, 8 and 9 which show the device in operation. In taking measurements with this device, the operator carries the ullage rod and tape to the roof of a tank such as a petroleum products storage tank and lowers the ullage rod into the tank as indicated in Figure 7. When the ullage rod strikes the liquid within the tank, the operator senses such fact through the flexible tape because the weight of the device is relieved by the buoyancy of the ullage rod valve mechanism in the liquid. Datum point 49, which has been established previously at a known elevation with reference to the bottom of the tank and the maximum height of the liquid, is secured on the roof of the tank structure. After the ullage rod has contacted the liquid the operator continues to lower the tape to the next, nearest cleat 27 on the tape 26 previously described. The space between the cleats is such that the graduated scale on the ullage rod will be equal to the cleat intervals on the tape thereby insuring that the ullage rod, after contact with the liquid, is not totally submerged but will be suspended within the liquid so as to indicate a liquid level within the space of the graduations of the scale. The support 49, now engaged by the tape 26 at a cleat 27, enables the operator to accurately measure the distance between the datum point and the bottom of the transparent tube on the ullage rod indicated as "0" by the graduated scale thereon.

Figure 8:
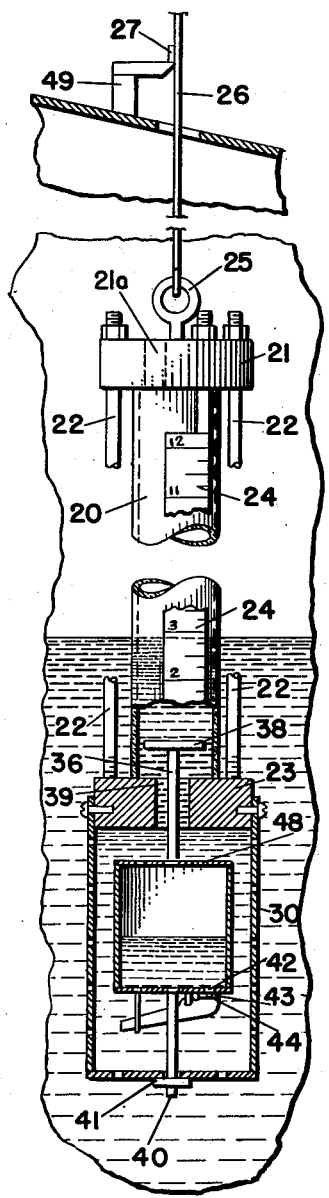
Figure 9:
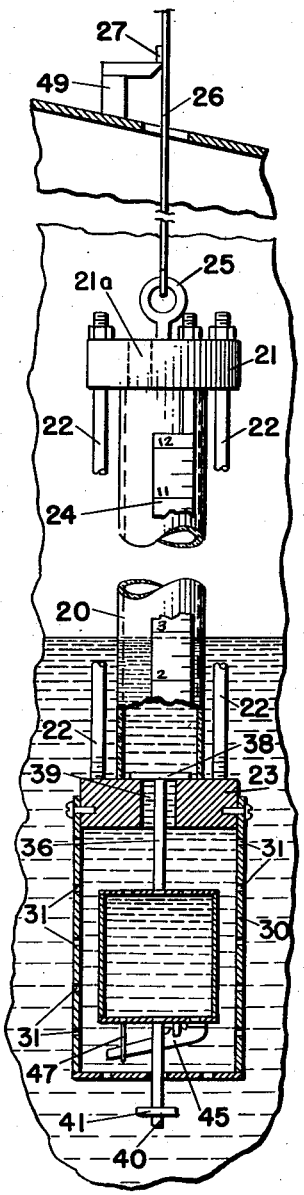

The ullage rod, being partially submerged at this time, is activated as illustrated in Figures 7, 8 and 9. The tank liquid enters the cage 30 through the apertures 31 and as the liquid rises within the cage 30, the hollow float 35 will be caused to rise to the full limit as determined by the stop 41 on the guide rod 40 assuming the position shown in Figure 7. As the float rises the valve 38, through the medium of the stem 36, uncovers the tube orifice 39 and permits the tank liquid to rise in the transparent tube 20. It will be noted, of course, that the stop 41 on rod 40 is positioned to prevent the top of float 35 from striking the underside of the lower cap 23, thus insuring a free passageway for the tank liquid to flow through the orifice 39 into the tube 20. After a short interval of time, the tank liquid rises in tube 20 to a point adjacent the liquid level within the tank as illustrated in Figure 8. During this period, in which the tank liquid is rising in tube 20, the liquid will also enter the orifices 44 formed in the flap valves 43 and thence through the orifices 42 formed in the bottom of the hollow float 35. As the orifice 44 is quite small in diameter, the time required for the liquid to enter the hollow float 45 is greater than that necessary for the tank liquid to rise to the proper height in tube 20. After the ullage rod has been partially immersed in the tank liquid for a sufficient length of time to fill the float 45 which is permitted by expelling air from the float body through the apertures 48, the liquid in the float and the weight thereof will cause the float to drop within the cage 30 and assume the position shown in Figure 9. Upon the dropping of the float, the valve 38 closes the orifice 39 and retains the liquid within the tube 20. As the sinking of the float 35 is a gradual action, the closing of the valve 38 does not disturb the liquid either within or without the transparent tube 20, thereby enabling an accurate liquid level measurement to be obtained. The weight of the column of liquid in the tube 20, acting on the top of the valve 38, and the weight of the float together with its liquid contents acting on the valve 38 from below, creates a sufficient pressure on the valve to insure proper closing and sealing. It should be noted also that the length of the valve stem 36 and the relative position of the valve 38 to the lower cap 23 is such that the valve 38, when in closed position, and resting on the lower cap 23, will space the bottom of the float 35 from the bottom of the cage 30 so that the free ends of the arms 45 do not contact the bottom of the cage. As aforementioned, the straps 47 will support the free ends of arms 45 so as to limit their downward and lateral movement. Thus, when the device is first inserted in the liquid, the free ends of the arms 45 will always maintain the flap valves 43 in contact with the bottom of the float 35, thereby restricting the orifices 42. Accordingly, the flap valves 43 are always maintained in a closed position when the liquid is entering the float 35.

After the ullage rod valve assumes the position shown in Figure 9, in which the liquid in the transparent tube is retained at the proper elevation, it may then be withdrawn from the tank. As the rod is withdrawn from the liquid within the tank, the liquid rapidly drains from the cage 30 through the plurality of apertures 31 and the pressure of the liquid within the hollow float 35 becomes greater than the surrounding atmospheric pressure. The internal fluid pressure within the float 35 acts upon the flap valves 43 and is sufficient to swing the arms 45 about pivots 46, overcoming the weight of the free ends of the arms. As the arms are rocked, the valves 43 open, permitting the liquid within the valve body to rapidly drain from the orifices 42. The draining of the cage and float body takes place as the operator withdraws the measuring device from the tank. The pressure of the column of liquid above valve 38 continues to force it downward preserving the liquid level in transparent tube 20.

After the device has been removed from the tank, the operator inspects the transparent tube 20 and notes the height of the column of liquid therein and takes the necessary reading from the indicia on or associated with the tube. The operator has previously made a note of the tape reading at the particular cleat which rested upon the pre-established datum point 49, and the two readings thus obtained will give an accurate measurement of the liquid level within the tank to a fraction of an inch. Reference to a prepared table will then indicate the cubic contents of the liquid stored within the container.

An example of the application of this device will give a clearer understanding of the apparatus already described. Let it be assumed that the full storage depth of a tank is 40 feet. The graduated tape, with cleats placed at the even foot marks, will indicate zero when the tank is empty and 40 feet when the tank is full, the graduations on the tape being in reverse as previously noted. If the contents of the tank registered a height of 27 feet, 8 inches, the operator would sense the ullage rod entering the liquid when the 27 foot mark was the nearest cleat above the already established datum point. This would indicate that the depth of the liquid in the tank was above 27 feet with relation to the bottom of the tank. On withdrawing the ullage rod from the tank a reading of 8 inches of liquid column within the transparent tube, the graduations increasing from the bottom of the transparent tube upward, would indicate without further calculation that the liquid depth was 27 feet, 8 inches. It will therefore be understood that a minimum of calculation is required of the operator and that the device indicates the true depth of the liquid to a fraction of an inch. The slow closing feature of the described valve mechanism disturbs the liquid within the tank to a minimum thereby insuring that the liquid column in the transparent tube is an exact measurement of the liquid elevation above the zero point on the ullage rod.

The accuracy of the device and the ease with which it can be used is readily determined from the above description. In addition, the preferred embodiment illustrated is rapid in operation. Tests made of the device show that the transparent tube will accept a column of the measured liquid equal to the depth of immersion before the valve 38 closes which requires 25 seconds. Subsequent to closing the valve, the float requires an additional 14 seconds to fill completely thereby expelling all air and insuring a tight seal. After being lifted from the liquid the flap valves 45 operate immediately allowing the float 35 to drain completely in 19 seconds which, under normal conditions, approximates the time required to pull the ullage rod free of the tank to take the reading.

I claim:

1. A device for measuring the liquid level in a tank comprising a transparent graduated tube adapted to be lowered into said tank and be partially immersed in the liquid; a valve cooperating with the lower end of said tube; means to actuate said valve to the open position when the rod is partially immersed in the liquid permitting said liquid to rise within the transparent tube to a level adjacent the liquid level in the tank and thereafter to close the valve before the tube is removed from the liquid thereby retaining the liquid level within the tube until subsequently released; said valve actuating means including a cage adjacent the lower end of said transparent tube having a plurality of apertures therein to readily admit the liquid, a hollow float movably supported within said cage and connected to operate said valve when immersed in the liquid, said float having apertures to permit a predetermined flow of liquid into the hollow interior thereof and cause the float to sink in said cage thereby closing the valve after the liquid has risen in said tube to a level adjacent the liquid level in said tank; and a flexible suspending tape having graduations thereon secured to the upper end of said transparent graduated tube, cleats mounted on said tape at regularly spaced intervals conforming to said graduations, said cleats being adapted to contact a fixed datum point on the top of the tank and maintain said tube at a known and fixed level when the measurement is taken.

2. A device as defined in claim 1 further characterized by means to rapidly drain said hollow float on removal from the liquid comprising a plurality of flapper valves positioned on the bottom of said float by suspending pivot members, the flaps of said valves having apertures of smaller area than the apertures in said hollow float with which they are registered, and guide straps depending from the bottom of said float to control the downward and lateral movement of said flapper valves.

3. A device as defined in claim 1 wherein said hollow float includes a guide and stop projecting from the bottom thereof to limit lateral and upward movement of said float.

4. A device for measuring the liquid level in a tank comprising an ullage rod including a transparent tube adapted to be lowered into a tank and be partially immersed in the liquid; a graduated scale associated with said tube; a tape having graduations thereon secured adjacent to the top of said tube for suspending the same; a valve cooperating with the bottom of said tube; and means for actuating said valve to the open position when the rod is partially immersed in the liquid to permit the liquid to rise within the tube to a point adjacent the liquid level in the tank and to thereafter close the valve before the tube is moved to retain the liquid within the tube when the rod is withdrawn from the liquid in the tank; said means including a cage mounted on said tube below said valve having a plurality of apertures for permitting the flow of liquid therein, a hollow float mounted in said cage and connected to said valve, said float being adapted to rise vertically within said cylinder when the rod is immersed in the liquid within the tank to thus open said valve, and having apertures therein to permit the liquid within the tank to slowly enter said float to fill the same with liquid and cause the float to sink in said cylinder to thereby close the valve after the liquid in said tube has reached a point adjacent the liquid level within said tank.

5. In an ullage rod for measuring the liquid level in a tank, the rod having a tube adapted to be lowered into a tank and be partially immersed in the liquid, the tube having a valve to permit the liquid in the tank to enter the tube and rise therein to a point adjacent the liquid level of the tank; the improvement comprising a float for controlling the opening and closing of said valve, said float having an orifice therein for permitting liquid to enter said float and substantially fill the same, a valve cooperating with said float for restricting said orifice and retarding the flow of liquid into said float, said float valve being arranged and constructed to open by the fluid pressure within said float when the float is withdrawn from the liquid level and permit rapid drainage of the liquid from said float.

6. A device for measuring the liquid level in a tank comprising a graduated tape and suspended therefrom a graduated tube the lower end of which is in free communication with the liquid in the tank when the device is lowered to partially submerge the tube in such liquid, a member at a fixed distance above the bottom of the tank, members on the graduated tape engageable with said fixed member and spaced apart at intervals corresponding to the length of the graduated part of the tube so that one of said tape-carried members may be engaged with the fixed member when said tube is partially submerged as above specified, a float within the tube permeable by liquid in the tank, a valve operable by said float to close liquid communication between the tank and tube when the liquid admitted to the float reaches a given weight, the rate of inflow of liquid to the float being so restricted as to allow the tube to be filled to the level of liquid in the tank before the valve closes by the weight of liquid in the float, upward withdrawal movement of the device above the liquid level in the tank allowing the liquid to drain from the float while said valve, by the weight of liquid in the tube and the weight of the emptied float, remains closed.

7. The device defined in claim 6 comprising valve mechanism adapted to throttle the inflow of liquid to the float during the flow of liquid into the tube and operable by the weight of liquid in the float, as such weight increases by continuing inflow of liquid to the float after the first mentioned valve is closed, to actuate said valve mechanism to allow free outflow of the liquid from the float in the upward withdrawal movement of the device.

8. In combination, a liquid storage tank and an ullage rod for measuring the liquid level within the tank; said rod comprising a graduated transparent tube having an opening in the lower end thereof, a valve cooperating with the tube opening, and means to slowly operate said valve on entering the tank liquid; said means including a cage depending from said tube adjacent the valve having a plurality of apertures therein for admission of liquid, a hollow float enclosed in the cage and cooperatively connected to said valve, said float having an orifice in the bottom thereof for admission of liquid; a tape having graduations thereon secured adjacent the top of said tube for suspending the same; cleats secured to said tape at regularly spaced intervals conforming to the graduations thereon; and a support mounted on the tank adapted to act as a datum point and constructed to engage the cleats on said tape.

9. The combination as defined in claim 8 further characterized by means to control the slow entry of liquid through the orifice in said float comprising a valve for said orifice to restrict the size thereof and retard the flow of liquid entering the float, said valve actuating automatically to open and permit rapid drainage of said float when the pressure of the liquid within the float exceeds the surrounding pressure and again closing and restricting the orifice after the liquid has been drained therefrom.

10. The combination as defined in claim 9 further characterized by said valve for the orifice in said float comprising a pivoted flap valve having an aperture therein of smaller dimensions than the said float orifice, said flap valve aperture being in registry with said float orifice to retard the inward flow of liquid when said valve is seated, and a pivotal mounting projecting from the bottom of said float supporting said flap valve in operating and registered position.

11. The combination as defined in claim 10 further characterized by said pivoted flap valve apertured to register with the float orifice comprising an arm having a pivotal connection between its ends to receive the pivotal mounting projecting from the float, said flap valve being secured adjacent one end of said arm on one side of said pivotal connection and positioned to contact the bottom of said float and underlie said float orifice, said arm being heavier on the end opposite said valve to maintain said valve in contact with the bottom of the float, the valve automatically responding to retard inward flow and to drain said float on variation of liquid pressure therein.

HAROLD A. QUIST.

REFERENCES CITED

The following references are of record in the file of this patent:

UNITED STATES PATENTS

| Number | Name | Date |
|---|---|---|
| 533,175 | Krouse | Jan. 29, 1895 |
| 1,478,288 | MacGregor | Dec. 18, 1923 |
| 1,633,581 | Gordon et al. | June 28, 1927 |
| 1,780,598 | Mayhall et al. | Nov. 4, 1930 |
| 1,845,129 | Coahran | Feb. 16, 1932 |
| 2,200,630 | McCabe | May 14, 1940 |
| 2,210,331 | Bindernagel | Aug. 6, 1940 |
| 2,257,357 | Watson | Sept. 30, 1941 |

FOREIGN PATENTS

| Number | Country | Date |
|---|---|---|
| 35,157 | Austria | Nov. 10, 1908 |
| 67,976 | Germany | Apr. 13, 1893 |